US005440214A

United States Patent [19]

Peeters

[11] Patent Number: 5,440,214

[45] Date of Patent: Aug. 8, 1995

[54] QUIET DRIVE CONTROL AND INTERFACE APPARATUS

[75] Inventor: Bradford D. Peeters, Costa Mesa, Calif.

[73] Assignee: Admotion Corporation, Irvine, Calif.

[21] Appl. No.: 153,128

[22] Filed: Nov. 15, 1993

[51] Int. Cl.6 ........................ H02P 8/00; G09F 11/10

[52] U.S. Cl. .................................... 318/685; 318/567; 318/696; 40/466; 40/467; 40/446

[58] Field of Search ............... 318/567, 696, 685, 671, 318/672, 102; 40/446, 463, 466, 467, 470, 476

[56] References Cited

U.S. PATENT DOCUMENTS 609,915 8/1898 Sibley .
1,172,360 2/1916 Hildburgh .
1,172,455 2/1916 Hildburgh .
1,322,542 11/1919 Chauvet .
1,594,703 8/1926 Ballerini .
1,938,899 12/1933 Gilman .
2,149,779 3/1939 Kroner .
2,151,055 3/1939 Stark .
2,163,188 6/1939 Bosche .
2,263,281 11/1941 Von Tadden .
2,605,965 8/1952 Shepherd .
2,645,047 7/1953 O'Gorman .
2,941,136 6/1960 Marantette et al. .
2,982,038 5/1961 Kass .
2,989,680 6/1961 Weiser et al. .
3,000,125 9/1961 Elvestrom .
3,014,302 12/1961 Hughes .
3,054,203 9/1962 French .
3,082,560 3/1963 Elvestrom .
3,086,306 4/1963 Morgan .
3,110,893 11/1963 Peacock .
3,572,925 3/1971 Ables et al. .
3,652,909 3/1972 Rainer et al. .
3,683,525 8/1972 Fukui .
3,742,631 7/1973 Hasala .
3,747,243 7/1973 Schneider .
3,862,504 1/1975 Ringelheim et al. .
3,883,966 5/1975 Ludwig .
3,902,901 9/1975 Vogel .
3,918,185 11/1975 Hasala .
3,953,764 4/1976 Miller et al. .
3,961,434 6/1976 Sampon .
4,050,809 9/1977 Boggs .
4,067,006 1/1978 Saylor et al. .
4,087,732 5/1978 Pritchard .
4,118,879 10/1978 Simon .
4,263,737 4/1981 Simon .
4,267,489 5/1981 Morohashi .
4,306,226 12/1981 Swarbrick .
4,438,379 3/1984 Chiang et al. .
4,491,434 1/1985 Barr et al. .

(List continued on next page.)

OTHER PUBLICATIONS

Digital Picture Processing, 1976, A. Rosenfeld and A. C. Kak, Academic Press, New York.

*Primary Examiner*—Bentsu Ro
*Attorney, Agent, or Firm*—Fulwider, Patton, Lee & Utecht

[57] ABSTRACT

A drive control and interface apparatus housed within an advertising display for driving a stepper motor coupled to a display device to sequentially display a plurality of images. The drive control and interface apparatus includes a microprocessor having program memory connected to the motor through a motor driver. A drive control program operates the microprocessor to drive the stepper motor to change the image displayed after a corresponding predetermined period of time. The program includes drive routines for fast and slow image changes that drive the stepper motor to minimize resonance. A control interface connects to the microprocessor. The program is responsive to the control interface to permit manual sequencing of the display and user selection of the corresponding display times for each image.

4 Claims, 16 Drawing Sheets

U.S. PATENT DOCUMENTS 4,508,802 4/1985 Heiart et al. .
4,525,658 6/1985 Yanagida .
4,542,376 9/1985 Bass et al. .
4,565,022 1/1986 Chapin .
4,616,327 10/1986 Rosewarne et al. .
4,620,288 10/1986 Welmers .
4,637,974 1/1987 Kubit .
4,683,408 7/1987 Inoue et al. .
4,684,262 8/1987 Meister .
4,779,033 10/1988 Morita .
4,897,802 1/1990 Atkinson et al. .
4,972,132 11/1990 Kitano et al. .
5,038,088 8/1991 Arends et al. .
5,045,767 9/1991 Wakatake .
5,100,330 3/1992 Sekiguchi .
5,198,741 3/1993 Shinada et al. .
5,225,756 7/1993 Coutu .
5,231,343 7/1993 Nakamura .
5,359,271 10/1994 Husher .

13/16

QUIET DRIVE CONTROL AND INTERFACE APPARATUS

BACKGROUND OF THE INVENTION

1. Field of the Invention

The present invention relates to advertising displays and more particularly to a drive control and interface apparatus for sequentially displaying multiple images in an advertising display.

2. Description of the Prior Art

With the advent of modern display advertising, limitations on advertising budgets and limited locations for display to high densities of consumers, a great demand has arisen for display advertising which utilizes attention grabbing animated displays and multiple display advertisements at individual popular display locations to thereby improve communication of the advertiser's message and enable a number of advertisers to benefit from a single location. Numerous different methods and devices have been proposed for preparing and displaying such advertisements. Many such devices involve relatively unwieldy mechanical elements driven by complex drive mechanisms which require a certain degree of mechanical precision. Thus, in addition to the expense of original manufacture, the user is often faced with expensive maintenance.

In addition, operation of these drive mechanisms tends to produce an undesirable amount of noise. Typically, these devices are used in public retail outlets or other public locations where the noise level of the drive mechanism frequently predominates over the background music being played at such locations. This noise detracts from the overall ambiance sought by the retailers using the advertising displays as a promotional tool.

It is desirable to have a system that displays multiple images wherein the exchange from one image to another is nearly instantaneous thereby enabling the sequential display of different images to produce the impression of animation. Such a sequential display would draw and hold a viewer's attention on what would appear to be an animated advertisement. However, quiet operation during image sequencing is desirable to minimize distraction from the overall environment where the system is located.

Display devices including templates with patterns of apertures which define numbers, letters or figures when they are illuminated by back lighting have been described. See, e.g., Hildburgh, U.S. Pat. No. 1,172,455, and Kass, U.S. Pat. No. 2,982,038. There have also been described display devices including transparency sheets which have images thereon and which are illuminated by back lighting and an overlay mask which blocks the back lighting from illuminating certain areas of the transparency sheets. See, e.g., Elvestrom, U.S. Pat. No. 3,000,125, Fukui, U.S. Pat. No. 3,683,525, and Hasala, U.S. Pat. No. 3,742,631.

In addition, devices have been proposed which include a translucent image screen made up of a mosaic of discrete images formed by relatively small interlaced translucent pixels or window segments which are arranged in uniform groups. The pixels corresponding to a discrete image occupy the same relative position in each group and bear corresponding magnitudes of translucency. The image screen may then be covered with an opaque screen having a uniform pattern of transparent display apertures. The opaque screen blocks back lighting from shining through the image screen except through the display apertures. The uniformly patterned display apertures are then aligned with pixels which correspond to a discrete image and the discrete image is thereby displayed due to the back lighting shining through the image screen and display apertures. The opaque screen may then be selectively shifted on the image screen such that the display apertures align with the pixels of a different discrete image. Thus, each discrete image may be sequentially displayed.

A device of this general description is shown in U.S. Pat. No. 4,897,802 to Atkinson et al., assigned to the assignee of the present application. The device, as described in that patent, exhibits excellent operational characteristics. However, it is desirable to have a more economical and reliable drive and interface system which enables convenient and accurate sequential display of the images that enables relatively noise free operation.

Drive systems using stepper motors controlled by an electronic circuit have been used on devices that exhibit quiet drive characteristics. See Pritchard, U.S. Pat. No. 4,087,732 and Cotu, U.S. Pat. No. 5,225,756. Such devices have been disclosed for use on laser printers and facsimile machines. See also Nakamura, U.S. Pat. No. 5,231,343 using a quiet drive apparatus for use with an automotive odometer. While these devices are fit for their intended purpose, they do not disclose a low cost quiet drive apparatus that enables the timed display of sequential images for selectively displaying multiple images to produce an animated effect or for the display of several images at one location.

SUMMARY OF THE INVENTION

The present invention is directed to a quiet drive and interface apparatus that causes the sequential display of multiple high resolution images wherein the exchange from one image to another is fast, accurate, and quiet.

The present invention includes an electronic drive controller connected in circuit with a stepper motor for the sequential exchange from one image to another. The image display time for the respective images may be adjusted in the drive controller to enable the sequential display of different images for periods of time that can give the impression of animation or can provide advertisers with a display comprising multiple independent images.

The present invention preferably includes a Central Processing Unit (CPU) with program memory connected in circuit through a stepper motor driver to the stepper motor for controlling the quiet operation of the stepper motor to sequentially display the images in the advertising display. A user interface connects to the CPU to allow user adjustment of the sequential timing of the image displays. The sequential display timing can be adjusted for any duration including the rapid sequencing of the images to produce animation. The CPU contains program code that recognizes the user adjusted timing durations and drives the stepper motor at a fast speed to achieve animated effects and a slow speed for adjustably sequencing a plurality of independent images. While both speeds of the stepper motor provide quick sharp registration of the display images, the slower speed produces less stress in the stepper motor while further reducing the noise level.

Other objects and features of this invention will become apparent from consideration of the following description taken in connection with the accompanying drawings.

DETAILED DESCRIPTION OF THE PREFERRED EMBODIMENT

Figure 1:
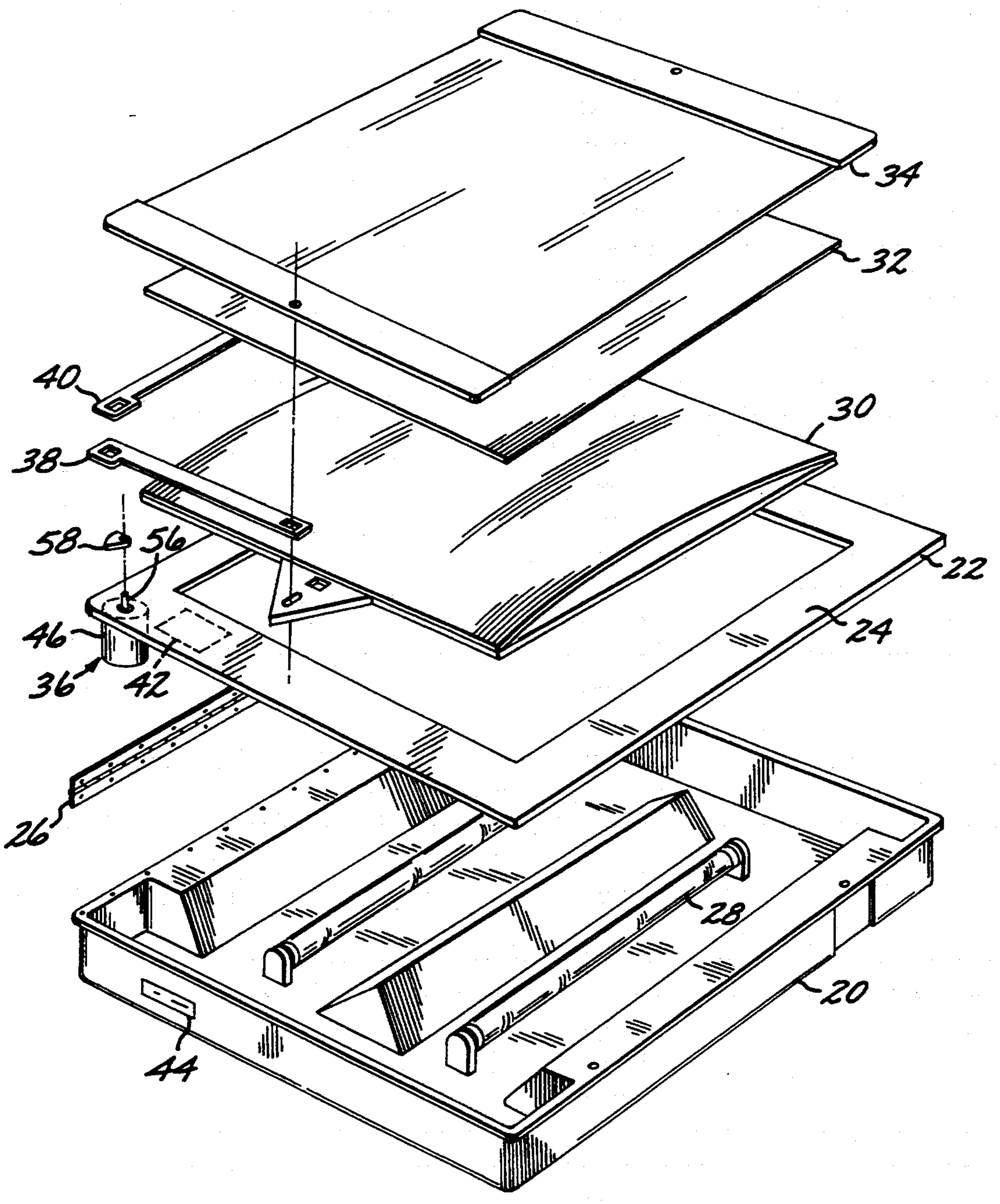
FIG. 1 is an exploded perspective view of the advertising display apparatus embodying the present invention.

Referring to the drawings, particularly FIG. 1, the drive control and interface apparatus of the present invention is housed in an advertising display that includes, generally, a housing 20 upon which is mounted a generally square frame 22 having a generally planar surface 24. A hinge 26 provides a connection between the housing 20 and the frame 22 along one side. The hinge 26 enables easy access lighting 28 in the interior of the housing 20.

A shiftable platen 30 is mounted on the planar surface 24 of the frame 22. Mounted on the platen 30 is an image screen 32 which is shifted with the platen 30 relative to a screening mask 34 for the purpose of selectively screening out certain portions of the screen 32 to enable projection of other portions of the screen 32. Although it is preferable that the platen 30 carry the image screen 32 and move it relative to the mask 34, the platen 30 could carry the mask 34 and move it relative to the screen 32.

Arrangements like this are well-known and described in U.S. Pat. No. 4,897,802 to Atkinson et al. incorporated by reference herein, so that no further description is required here.

With continued reference to FIG. 1, the drive control and interface apparatus of the present invention includes, generally, an eccentric drive mechanism 36 mounted on the frame 22 for driving coupling arms 38 and 40 to sequentially shift the platen 30, and consequently the image screen 32, into four extreme positions defined by the four corners of the frame. The drive control 42 which actuates the drive mechanism 36 is mounted within the housing underlying the frame. Mounted on the outer surface and connected in circuit with the drive control 42 is the drive interface 44 for manual adjustment of the drive control operation.

Figures 14, 15:
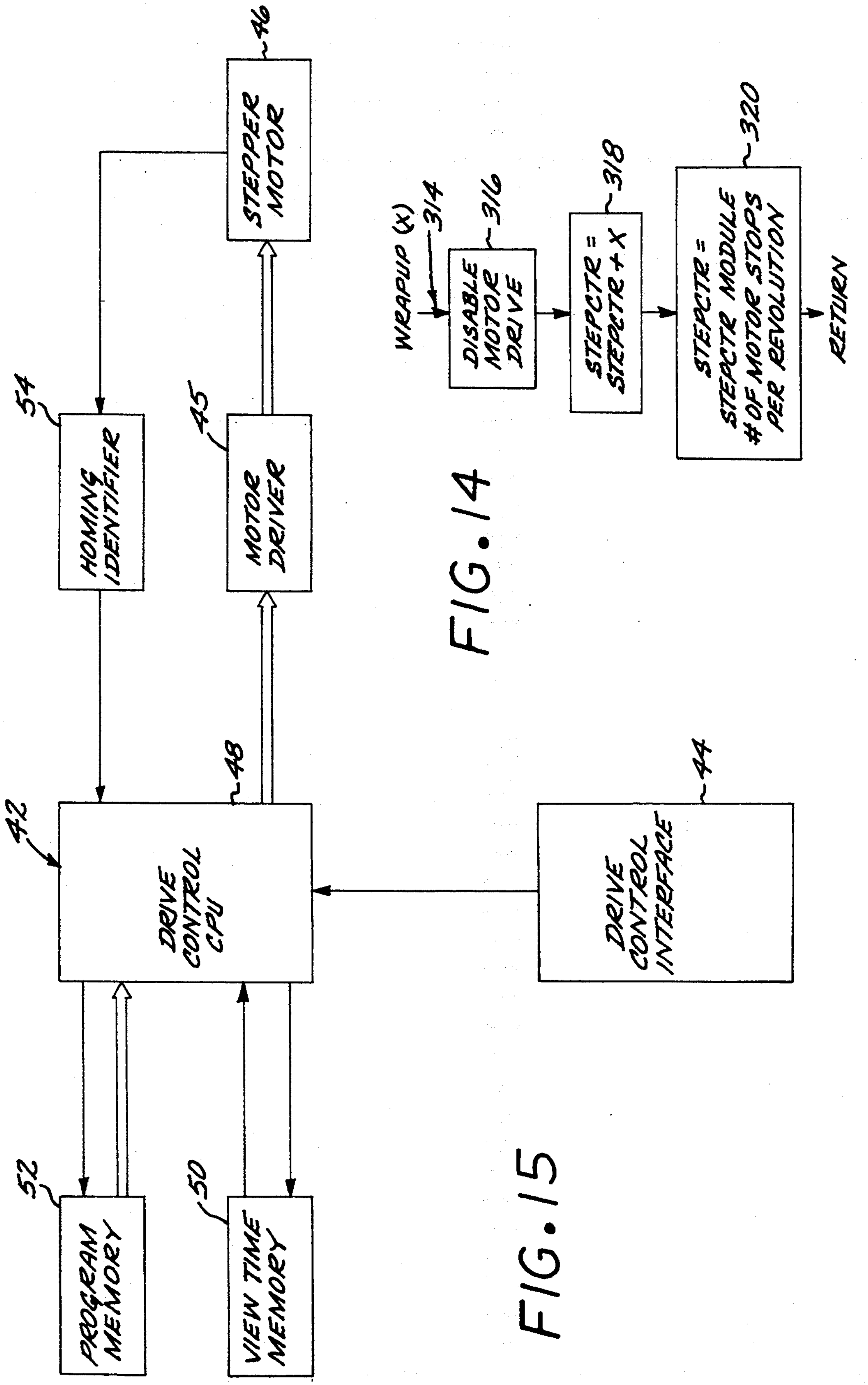
FIG. 15 is a functional block diagram of the drive control and interface circuit included in the apparatus shown in FIG. 1.

Functionally, the drive control 42 (FIG. 15) includes a motor driver 45 to provide the necessary output power to a drive motor 46, a control Central Processing Unit (CPU) 48 with view time 50 and program 52, storage memory and a homing identifier 54 to monitor the drive motor 46.

Figure 2:
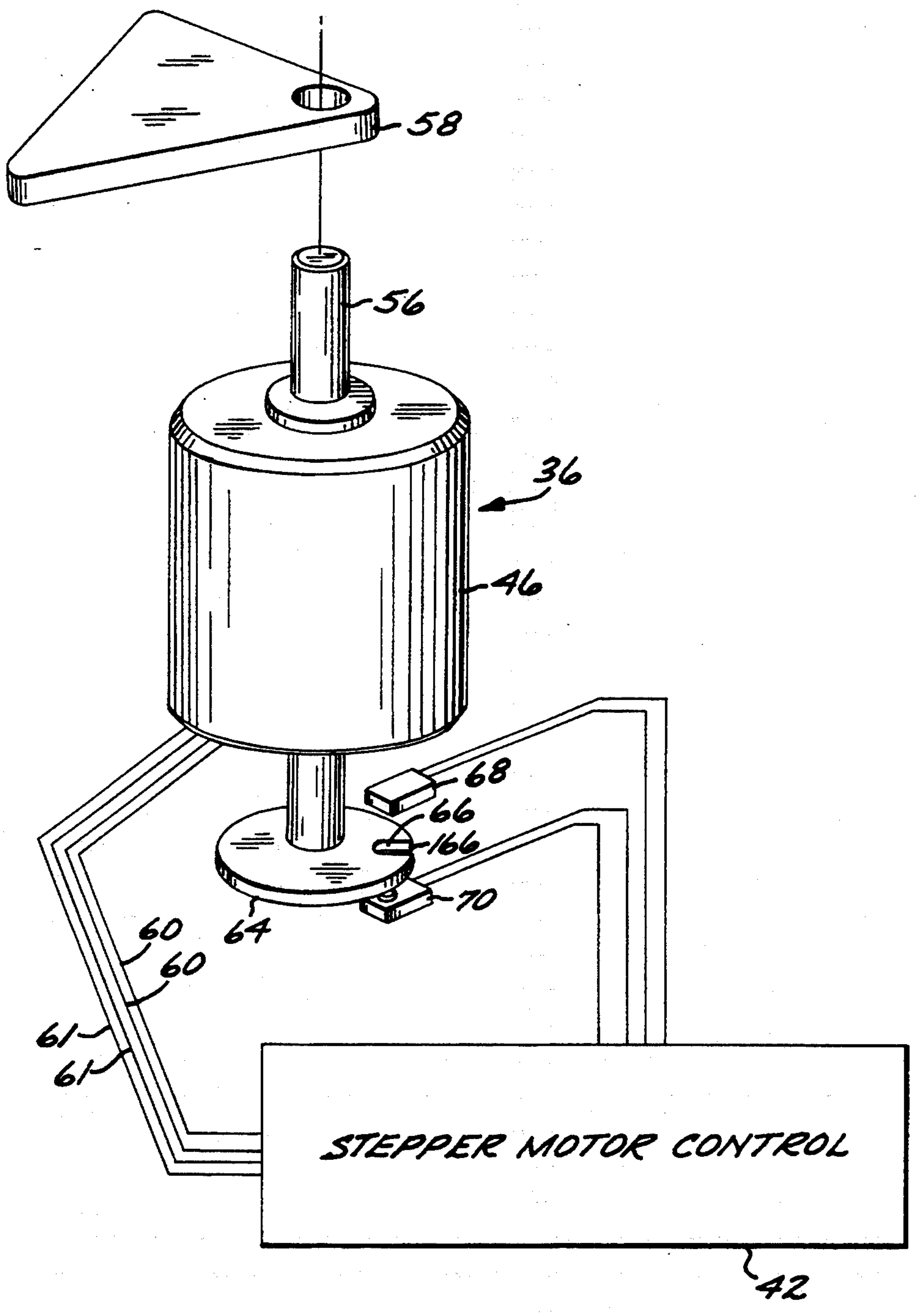
FIG. 2 is a perspective view, in enlarged scale, of a stepper motor and drive controller apparatus included in the apparatus shown in FIG. 1.

The drive motor 46 (FIG. 2) consists of a stepper motor characterized by the fact that it can be driven from and stopped at precise rotary positions. The stepper motor includes a drive shaft 56 mounting on one end an eccentric cam 58 engaging the two cam arms 38 and 40 such that rotation of the eccentric cam at 90° intervals serves to position the image screen at each of the four extreme positions in a square pattern. In the exemplary embodiment, a two phase bipolar stepper motor of the type STH-55D-331 manufactured by Shinano Kenshi Corp. at 5737 Mesmer Ave., Culver City, Calif. 90230, is used which features a durable cast body and employs long lasting ball bearings for rotor support to ensure a longer service life. This stepper motor is capable of 200 steps per revolution which provides the necessary accuracy for correctly positioning the rotor at each of the four extreme positions. The stepper motor includes two pair of input power leads 60 and 61 connected to the control drive motor 46 which provides power to two drive coils in the stepper motor. Carried on the opposite end of the drive shaft 56 from the eccentric cam is a stroboscope formed by an opaque disk 64 having one notch 66 cut into the perimeter that functions as a homing identifier 54. An optical sensor 68 and corresponding LED 70, mounted to the outer housing of the drive motor about respective opposite sides of the perimeter of the stroboscope, connect in circuit to the drive control to function as a homing sensor 72 that transmits a homing signal to the CPU 48 in response to sensing the rotational passage of the notch between the optical sensor and the LED by the transfer of light therebetween which is normally blocked by the opaque disk.

The drive control itself may be connected to a conventional power outlet through a 120 VAC 60 Hz to 12.5 VDC transformer 74 in series with a 2 Amp. fuse 76 and optional power switch 78 to a 12 VDC to 5 VDC voltage regulator 80 connected within the drive control circuit 42. The driver 45 connects to the two pair of power leads 60 and 61 from the drive motor 46. The motor driver receives two-state load and phase signals for each of the drive coils in the stepper motor through four respective input leads 82–85 connecting to respective output pins on the CPU 48. The CUP OR microprocessor 48 has an 8-bit data/address bus 88 that connects to the program memory 52 through an 8-bit latch 90 and an 8 bit address only bus 92 that connects directly to the program memory 52 to form a 16 bit address bus and 8 bit data bus. The microprocessor also connects with an electrically erasable programmable read only memory (EEPROM) which functions as the view time data memory 50, an 8 MHz clock 94, a system error reset 96, the control interface 44, and the homing identifier 54 on the stepper motor.

The microprocessor in the presently preferred embodiment is an 80C31 microprocessor manufactured by Intel of Sunnyvale, Calif. This microprocessor includes four 8-bit data ports zero through three configured herein such that zero and two ports connect with the program memory 52 to form the 16-bit address bus with port 0 also functioning as an 8-bit data bus. Port three connects with the view time memory 50, the homing identifier 54, and the control interface 44. Port one connects with the remaining components including the system error reset 96 and the stepper motor driver 45.

Figure 6:
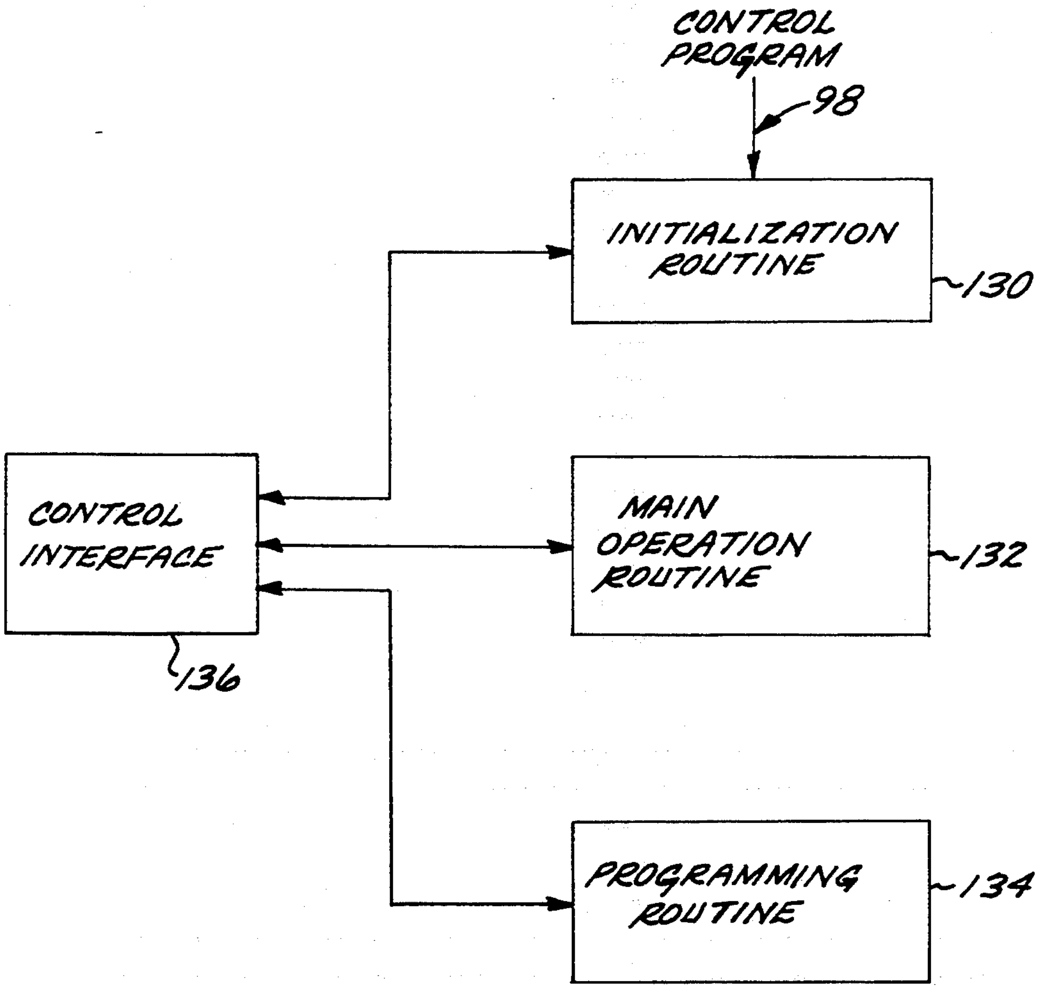
FIGS. 6–14 are flow diagrams of the drive control program and subroutines incorporated in the apparatus shown in FIG. 1.
Figure 6A:
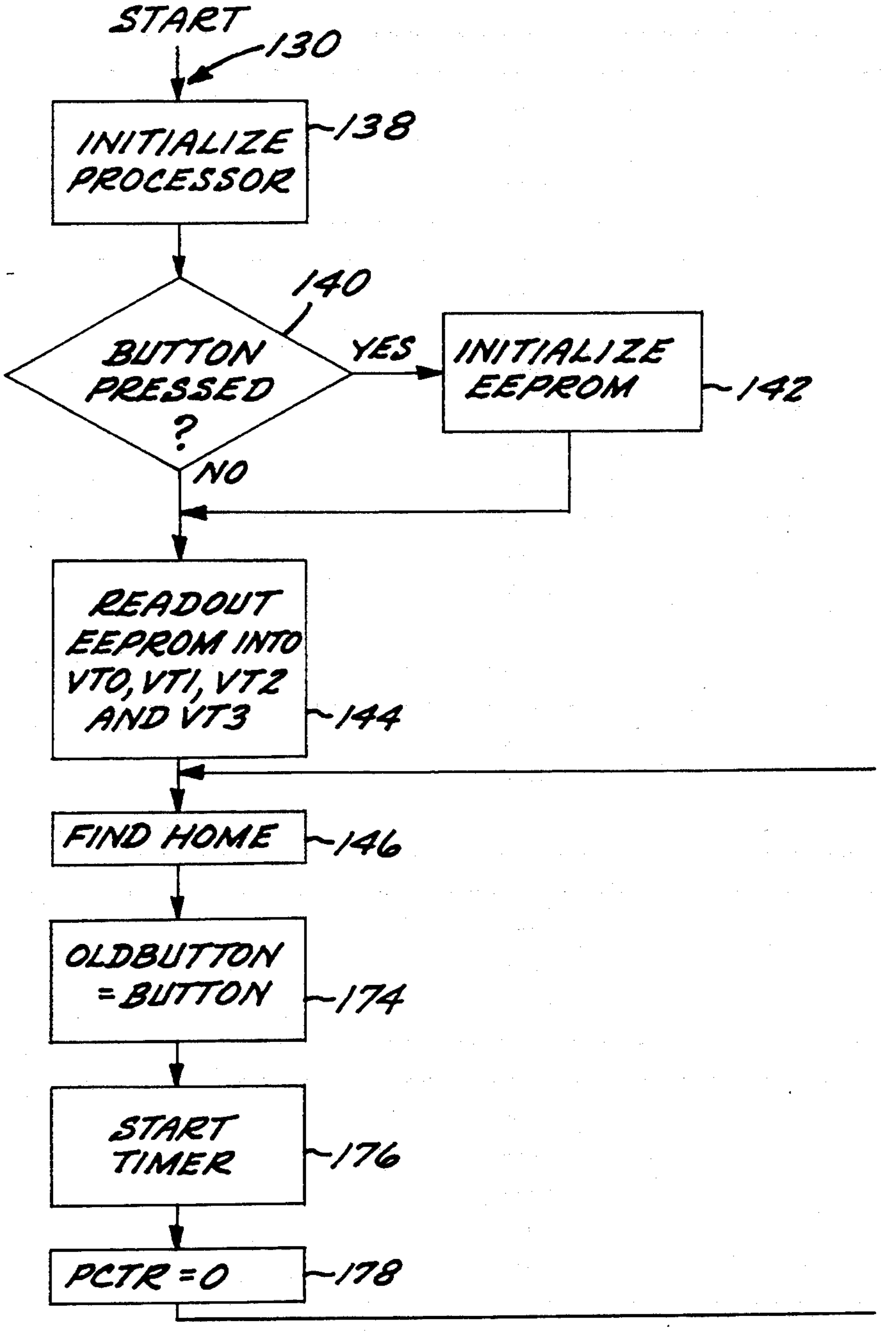
Figure 6B:
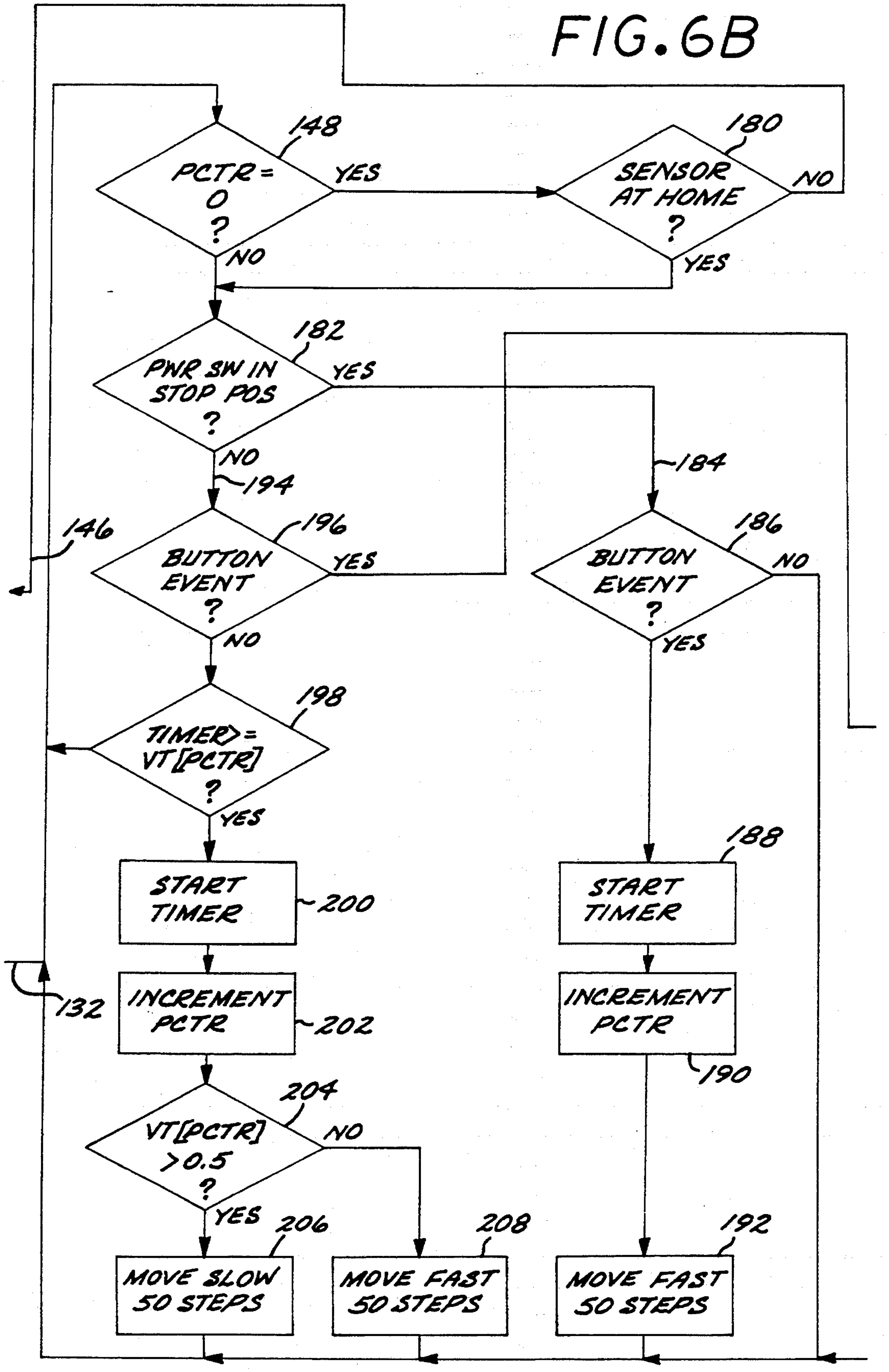
Figure 6C:
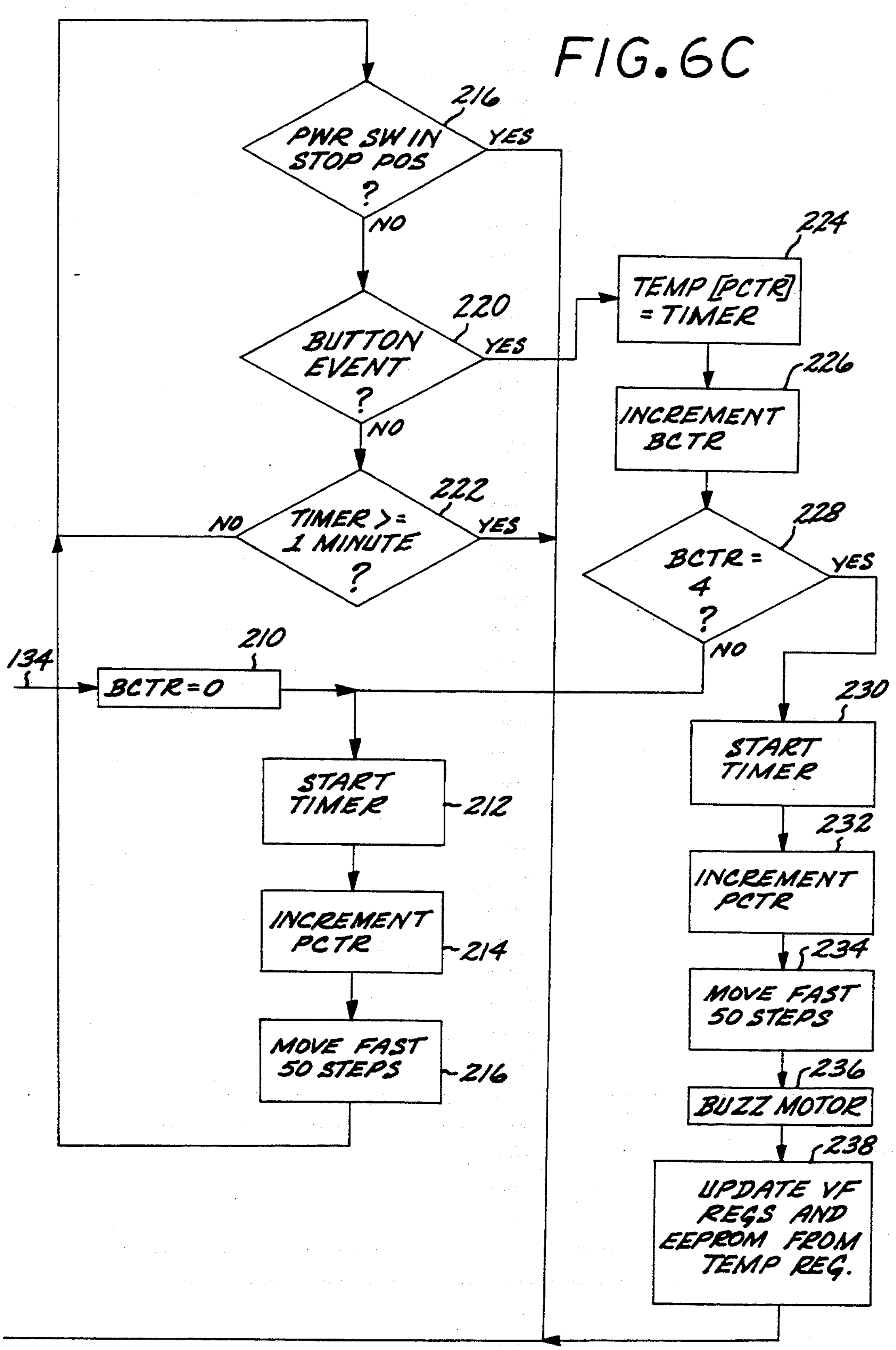

The microprocessor is driven by a drive control program 98 stored (FIGS. 6A–6C) in the program memory (FIG. 3) which includes 32 kilobytes of storage space.

The 16 bit address bus (FIG. 3) is configured between the program memory 52 and microprocessor 48 to provide external execution of the drive control program. Thus, rather than load the program into the limited memory in the microprocessor, the microprocessor directly accesses each byte of program code from the external memory and upon receiving the code executes the instruction. The latch 90 connected between port zero and the memory functions to maintain the address during the data transfer periods. An address latch enable bit lead 100 connects from the microprocessor to the latch to toggle the latch between address transfers and data transfers. A data toggle lead 102 connects to the program memory from the microprocessor 48 to strobe the memory to send the requested data when the first port toggles from address transfer to data receive mode.

The view time data memory 50, which retains data even when power is lost, connects through read and write leads 104 in microprocessor port three. In the exemplary embodiment, the EEPROM is of the type model no. X24C00 manufactured by XICOR of Milpitas, Calif.

The control interface 44 consists of a slide switch 106 and a spring biased button 108. Both the switch 106 and button 108 may be manually operated to close a circuit between ground and respective input 110 and interrupt 112 leads within port three on the microprocessor. The respective input and interrupt leads may be selectively driven from a high open circuit to a low when the switch and the button connect to ground 114 respectively. Although the control interface could also use a conventional VCR LCD display type control panel, it will be appreciated by those skilled in the art that this low cost switch and button combination may be used to obtain any necessary interface commands between the user and the drive and control as required to control the advertising display timing and sequencing.

The homing sensor 68 connects to an interrupt lead 116 in port three of the microprocessor similarly to the button 108 of the control interface. The sensor 68 drives the load interrupt input between high and low voltage levels in response to sensing the homing identifier notch 66 to signal that the stepper motor is in the home position.

Connected to a pair of parallel output leads 118 from port one, the system error reset lead 118 connects to a first timing capacitor 120. The other side of the first timing capacitor connects to a pair of diode and resistor strings 124 and 125 configured such that the first timing capacitor charges quickly through the first string 124 when the input leads 118 are low, and discharges slowly through the second string 125 when the input leads 118 are high. A second timing capacitor 126 and an operational amplifier 128 are configured in a circuit that will be recognized as a hysteresis oscillator by those skilled in the art. The discharge leg of the second diode string 125 is connected to the second timing capacitor 126. Hence the discharge of the first timing capacitor 120 charges the second timing capacitor 126. As long as the leads 118 of system error reset circuit are continuously pulsed, the second timing capacitor 126 will be held charged, preventing the op. amp. 128 from oscillating. The system error reset 96 functions as a watchdog timer. In the event the program hangs-up, pulsation of the reset circuit leads 118 will cease, and the microprocessor will be reset.

Four output leads 82–85 from port three of the microprocessor connect to the respective input leads on the motor driver 45 and provide respective load polarity signals and respective pulse width modulation (PWM) signals for the respective power loads in the stepper motor. In the presently preferred embodiment, the motor driver is of the type model no. UDN2998W manufactured by Allegro of Worcester, Mass. This particular motor driver is capable of delivering up to 3 Amps of output power to adequately drive the stepper motor.

Stored within the program memory 52, the control drive program 98 (FIG. 6) generally includes an initialization routine 130 initiated following power-up, a main operation routine 132 to ensure the continuous display of the images, a programming routine 134 to manually change the display times, and control interface 136 subroutines to recognize various signals from the control interface.

The initialization program 130 (FIGS. 6 and 6A), which is initiated during power-up of the drive control circuit or upon the system error interrupt detecting an error, generally resets all of the microprocessor internal registers and returns the stepper motor to the home position before initiating the main program routine. An initialize processor step 138 resets the microprocessor stack pointer, clears all flag bits in the flag registers and resets four internal view time registers which store the respective display times for the four images to a factory preset initial display time. While this initial display time can correspond to any valid display time, a factory preset display time of 3.75 seconds is chosen in the preferred embodiment. A button pressed conditional 140 checks the register corresponding to the interrupt input lead 112 (FIG. 3) connecting to the button 108 in the control interface. If the register is set at zero, then the button 108 is being pressed and the initial display time values are transferred to the view time EEPROM 142, thus resetting the view time EEPROM to the factory preset value. Regardless of the button pressed condition, the display time values within the view time EEPROM are next copied into the internal view time registers 144.

Next the initialization routine performs a find home routine 146 (FIG. 10) to operate the drive motor until the first image is displayed which corresponds to the mechanical alignment of the home identifier notch 66 between the LED 70 and optical sensor 68 to generate the homing signal.

The find home routine 146, which is performed at startup and any time a step counter register in the microprocessor indicates the motor 46 is at home but the microprocessor fails to receive a homing signal, operates the stepper motor 46 through up to one full rotation of the drive shaft 56 and then stops the motor when the leading edge 166 of the homing identifier notch is aligned mechanically with the homing sensor. Find home starts by setting the step counter register to zero 152. Find home includes a homing signal clear segment that clears the homing sensor before searching for the leading edge of the homing indicator notch. In order to ensure the homing sensor is clear, the homing sensor lead is read to determine whether the notch is aligned with the homing sensor 154. If the notch is aligned, the drive rotor is rotated one step 156 and the step counter is incremented by one 158 until the following edge of the homing indicator notch blocks the homing sensor thus stopping the homing signal. If the counter becomes greater than the total number of steps necessary to complete a full revolution of the drive shaft before the homing signal stops 160, find home checks for a pushed button condition by checking the button register 162. If a button is pushed, then find home is restarted 164, otherwise the pressed button is again polled 162. This polling continues endlessly, resulting in no further movement of the sign, until the button is pressed. Once the homing sensor is clear, find home scans for the leading edge of the indicator notch 165 and successively increments the drive shaft and counter one step at a time 168 and 170 until the leading edge is found or the counter exceeds the number of steps for a full revolution 171 in which case the button pressed loop already described is executed 162. Once the leading edge is found, the step counter is set to zero 172.

Upon concluding the find home routine, the button condition flag register is set to indicate the current state of the button 174, the display timer is started 176, and the position counter is set to zero 178 to reset the microprocessor for the main operation routine.

The main operation routine 132 (FIGS. 6 and 6B) controls operation of the stepper motor during normal display of the images. An image display conditional 148 checks whether the step motor is at the home position. If the position counter is zero indicating the home position, the homing signal lead is checked 180 to verify the counter by checking for the homing signal. If there is no homing signal, the find home routine 146 in the initialization program is run again.

Next, the status of the run/stop switch is checked 182. If the switch is positioned to close the circuit to ground, then a stop loop 184 is initiated. The stop loop 184 checks for a button event 186. If the button has been depressed or depressed and released, then the timer is started 188, the pointer is incremented to the next image 190, and the drive motor rotates the rotor to advance the display to the next image 192 thereby causing a manual change in the display image in response to the button event. Otherwise, without a button event, the stop loop merely cycles back to the image counter conditional 148.

If the run/stop switch is open, then a run loop 194 is initiated. A button event is checked 196 for and, if the button has been depressed or depressed and released, then the programming mode 134 is initiated. Otherwise the microprocessor checks whether the image display time has been reached 198. If not, then the microprocessor returns to the image counter conditional 148. If the display time has been reached or exceeded, then the timer is restarted 200, the pointer counter is incremented to the next image 202 and the display time for the next image is checked 204. If the display time exceeds .5 seconds, an image slow change routine 206 is initiated to optimize the quiet operation of the motor, otherwise an image fast change routine 208 is initiated to provide rapid sequencing between the images for animated effects. Following an image display change the microprocessor returns to the image counter conditional 148.

The programming routine 134 (FIGS. 6 and 6C), initiated by the occurrence of a button event while in the run loop, initializes a button counter 210 and enters a programming loop which starts the timer 212, increments the position counter 214 and quickly advances the step motor into the next display position 216. Next the run/stop switch lead is checked 218 and, if the switch is in the stop position, the microprocessor will exit the programming routine. If the power switch remains in run mode, then a button event condition is checked 220 and, if a button event has not occurred then the timer continues to measure the first image display time up to a display time limit. Should the display time limit be exceeded 222, the microprocessor exits the programming loop and returns to the normal run loop. When a button event does occur, the elapsed time between button events is stored 224 in a temporary register corresponding to the image being displayed, the button counter is incremented 226 and the button counter is checked 228 to determine whether a new time has been obtained for each of the images. If all the new image times have not been recorded, the program returns to the start 212 of the programming loop to do the next image. When all images have been completed, a record new times routine begins. The record new times routine first displays the next image by initiating the start timer 230, incrementing the position counter 232 and moving the step motor to display the next image 234. An audible alarm is generated 236 by sending discrete audible-frequency power pulse signals to resonate the stepper motor to indicate to the user completion of the programming loop. Finally, the new display times stored in the temporary registers are transferred 238 to the view time registers and the nonvolatile EEPROM memory. The programming loop then exits to the start of the run loop 134.

Figure 7:
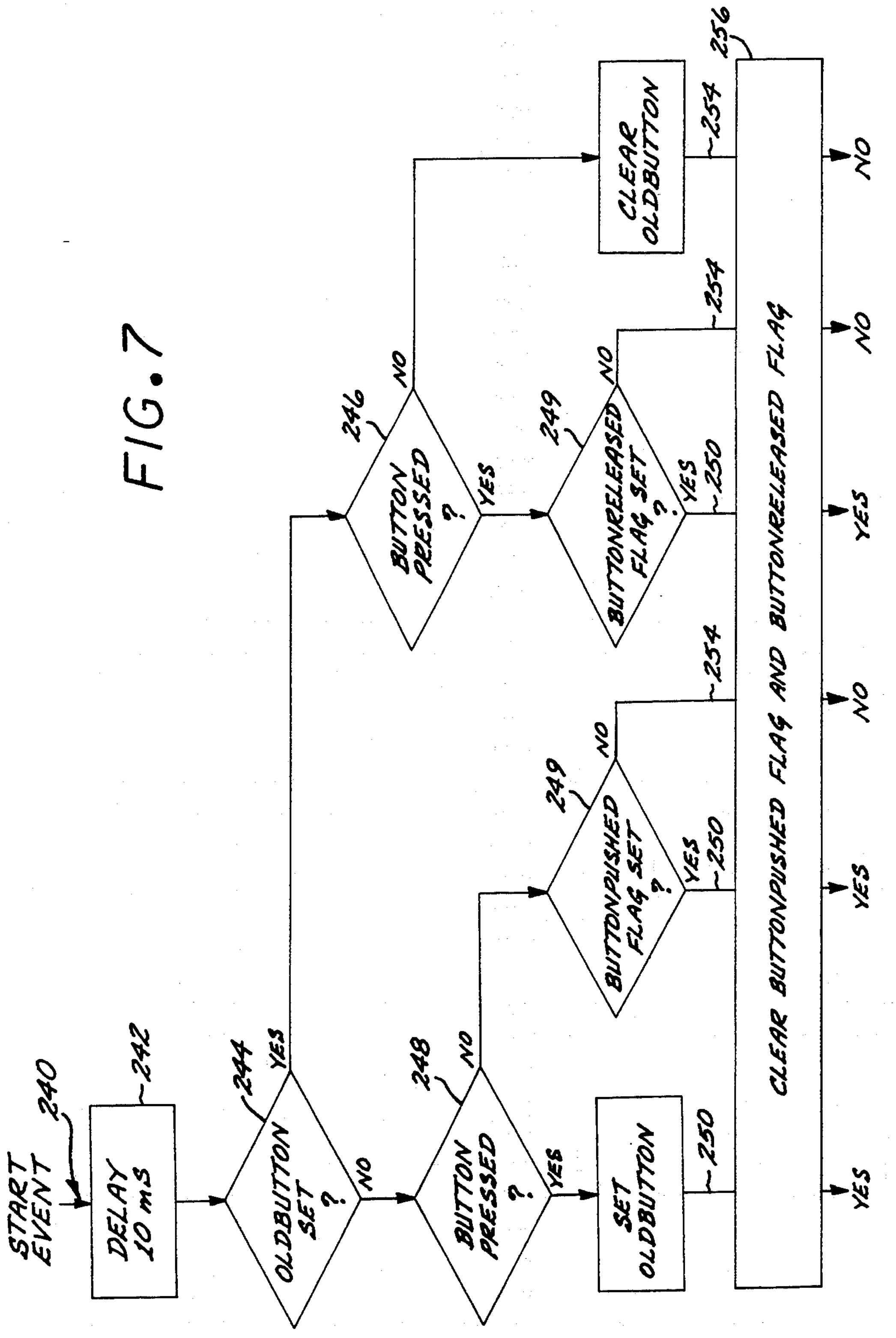

Unlike the run/stop switch check, the button event routine 240 (FIG. 7) checks for a change event in the button condition. A 10 ms delay 242 is added for timing. If the button was previously depressed 244, the button event routine checks whether it has been released 246. If the button was previously released, the button event routine checks whether it has been depressed 248 and the corresponding flag 249. If a released to depressed transition has occurred, the button event routine indicates that a button event has occurred 250 allowing the microprocessor to react accordingly, otherwise the routine indicates that a button event did not occur 254. The flags are cleared 256 and the routine returns.

There are two motor drive routines (FIG. 6B) in the program that advance the motor to the next image using digital approximation of sinusoidal power wave forms to quietly drive the motor. A slow advance routine 206 advances the motor slowly to optimize the quiet drive characteristic. A rapid advance routine 208 advances the motor rapidly to achieve animation between the images, but does not fully optimize the quiet drive feature.

Figure 4A:
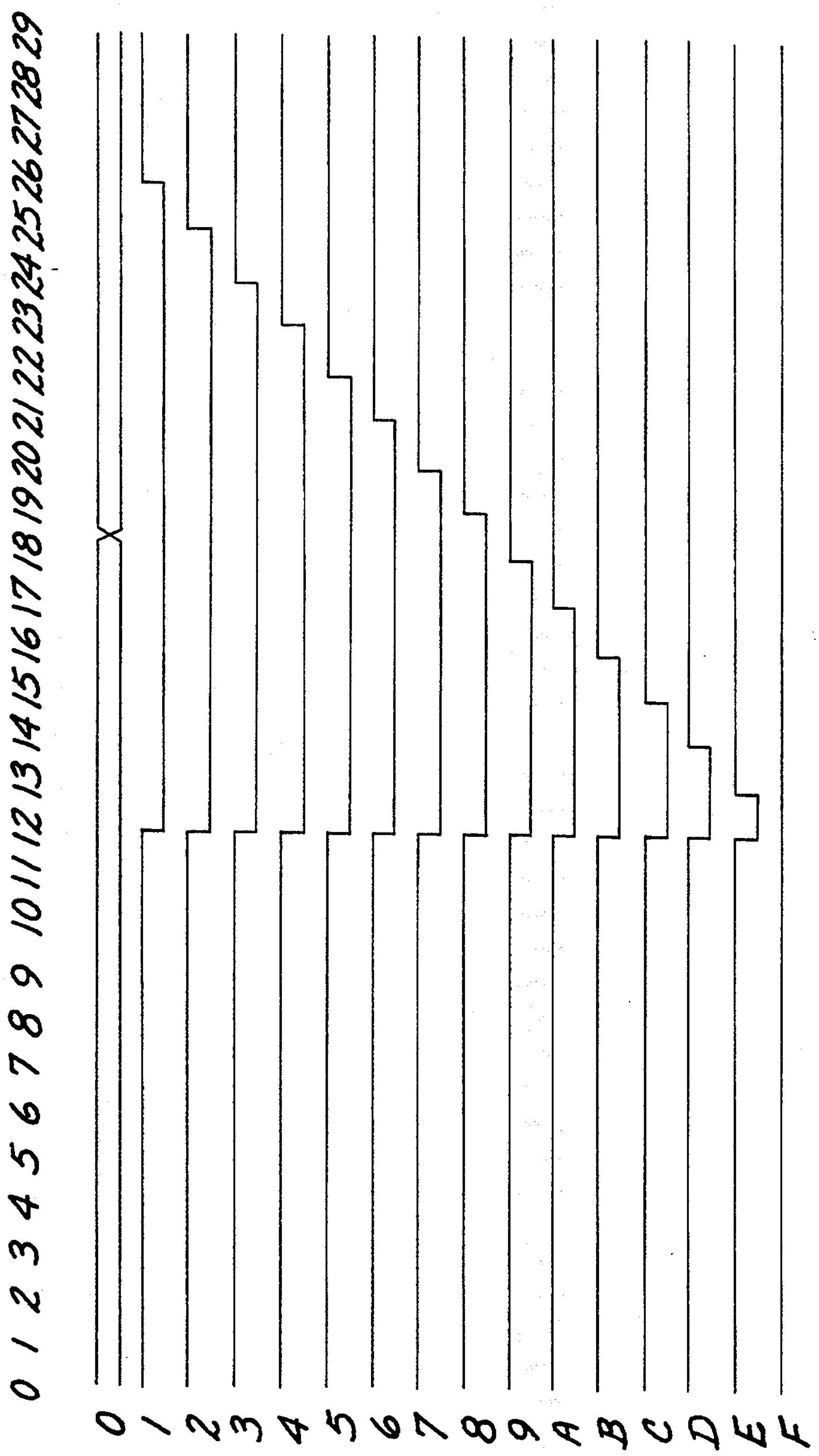
FIGS. 4A and 4B is a pulse width modulation timing diagram depicting pulses generated by the controller apparatus included in the apparatus shown in FIG. 1.
Figure 4B:
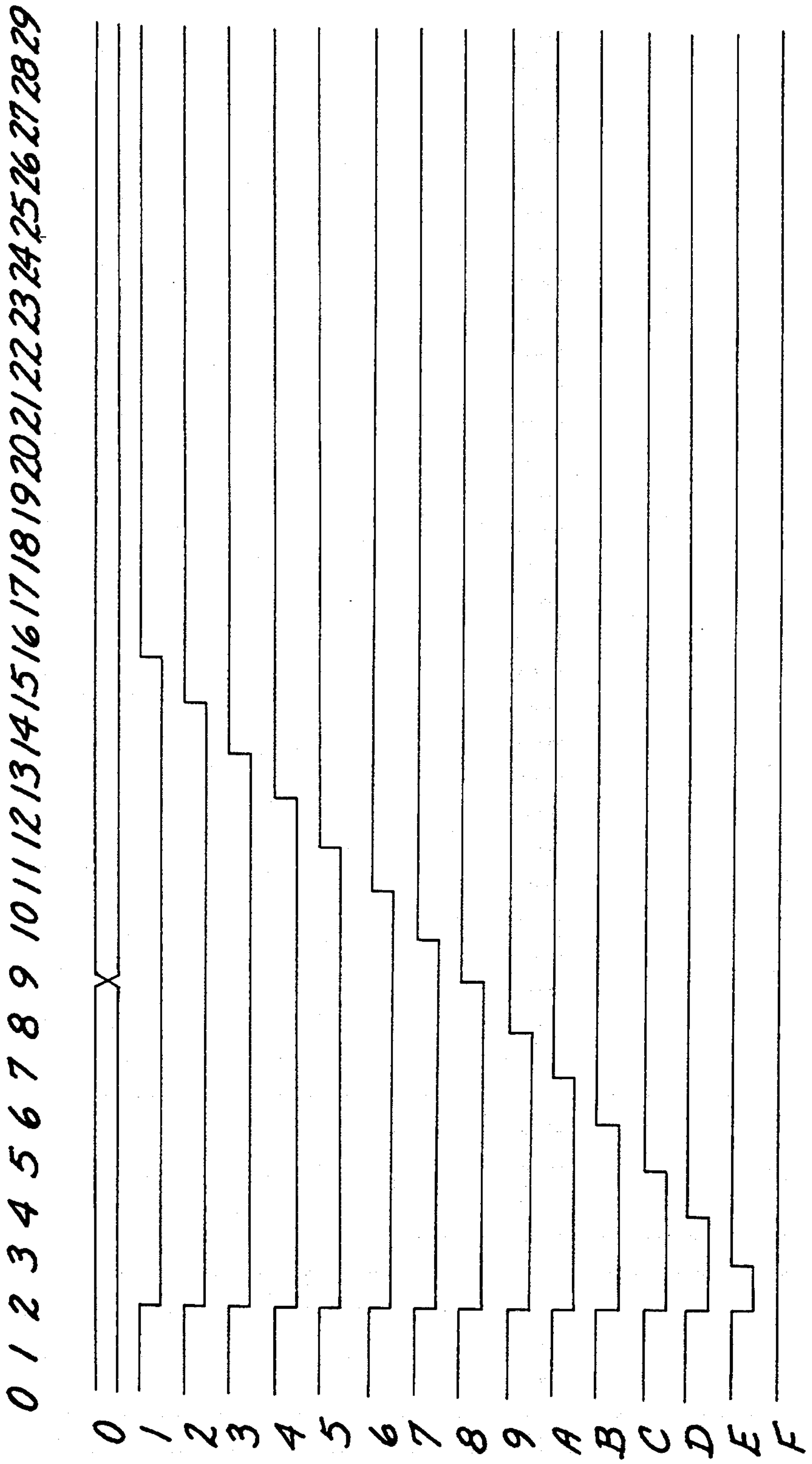
Figure 5:
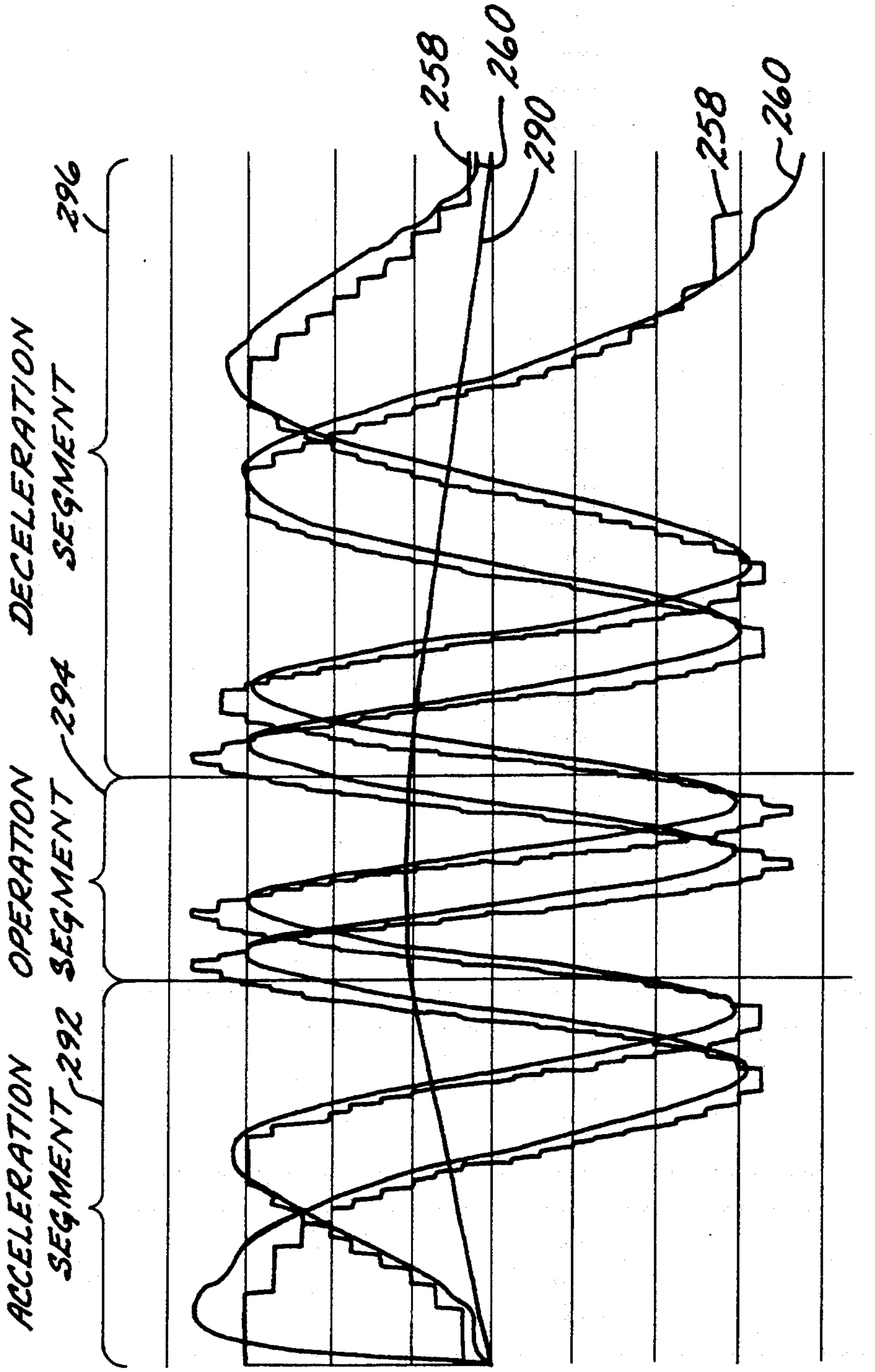
FIG. 5 is a diagram showing input signals for the stepper motor power shown in FIG. 2.

Each of the drive routines generate the sinusoidal power drives using pulse width modulation (PWM) timing (FIGS. 4A, 4B and 5) to approximate a sine wave using 31 discrete levels which is possible because the power loads are inductive and therefore do not respond to very rapid voltage changes. Those skilled in the art will appreciate that the simplest way to generate the PWM timing 258 (FIG. 5) is to have the microprocessor compute a sine wave 260 and produce a series of PWM pulses corresponding to the magnitude of the sine wave. However, this method was not feasible given the low-cost drive control hardware and the timing requirements of the display apparatus. Instead, straight line coding of each PWM timing step 262 (FIGS. 4A and 4B) is implemented using subroutines that generate the PWM pulse corresponding to the instantaneous magnitude of the desired sine wave form. The cycle time of each pulse is set at 30 instruction cycles which equates to 45 microseconds in an 8031-family microprocessor driven by an 8 MHz clock and ensures a pulse rate sufficient to produce an analog signal equivalent in the stepper motor. Additionally, 45 microseconds corresponds to a frequency of 22.22 KHz, sufficiently high to ensure that the PWM frequency is itself ultrasonic and does not contribute to the audible noise of the motor drive. The PWM timing is achieved using 16 steps 264 and 265 between a 50% duty cycle and a 100% duty cycle for each pulse. A 50% duty corresponds to a zero level, i.e., equal parts of positive and negative drive. A 100% duty cycle is full drive. By inverting the PWM pulse, the microprocessor can easily increase the number of PWM steps to 31 by allowing each of the 15 non-zero PWM steps 264 and 265 to be used as both a positive and negative drive. In this way, only half of the possible PWM pulses need to be programmed. Since the stepper motor has two coil windings, a separate PWM pulse 264 and 265 must be generated on each of two drives which amounts to 16×16=256 total possible combinations for both power loads. To minimize possible electrical noise spikes, each of the 256 pulse-generating subroutines generates its two pulses with staggered timing. This avoids having both drives transition at the same time hence reinforcing each other's noise generation.

Figure 8:
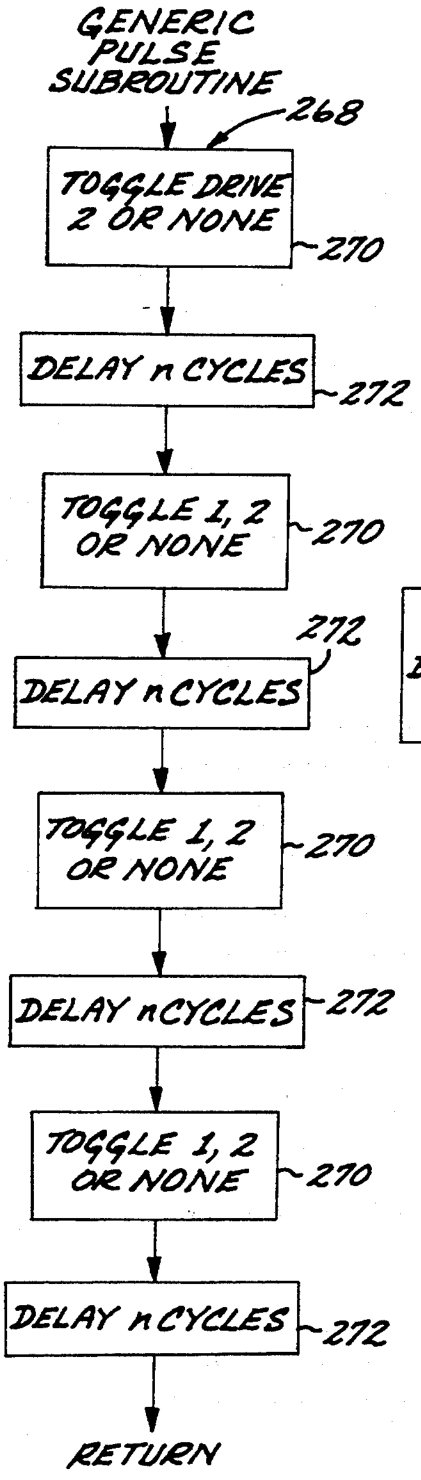
Figure 9:
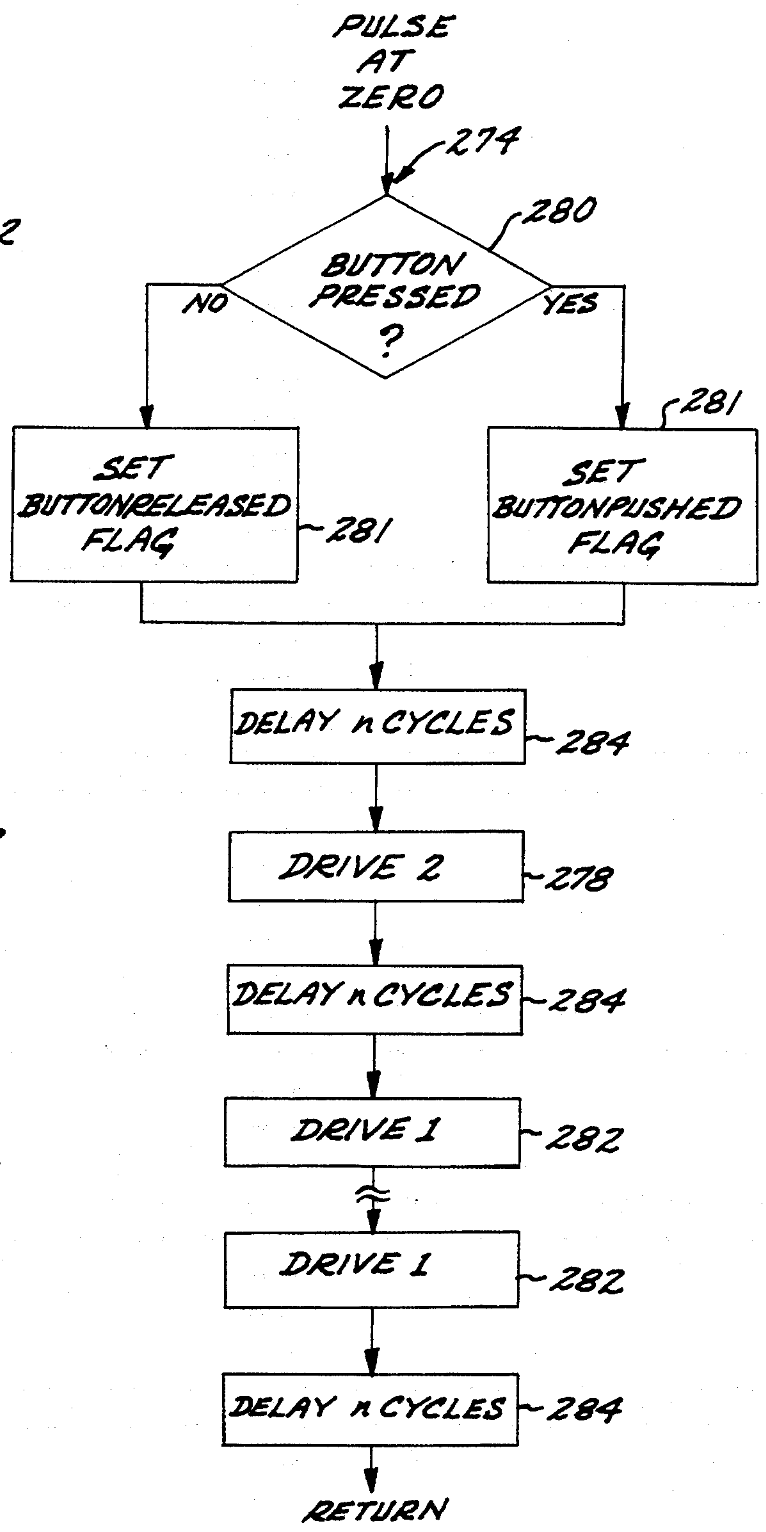

Each pulse subroutine 268 (FIG. 8) for the 15 non-zero PWM steps corresponds to a 25 instruction cycle subroutine which toggles each of the power drives 270 for the corresponding duty cycle periods 272 and back before returning. The zero-level PWM steps 274 are a special case, described below. Five instruction cycles are needed as overhead to advance between subroutines thereby providing the 30 instruction cycles for each pulse. Those skilled in the art will appreciated that there is one 25 instruction cycle subroutine for each of the 256 possible combinations. Subroutines which include a zero pulse level 274 for either power load toggle the respective drive only once 278, thus reversing the polarity of subsequent PWM pulses to the respective power load and thereby allowing a transition between the positive and negative portions of the sinusoidal wave form. The button is checked 280 to set corresponding flags 281 during such subroutines as well to allow button events to be detected in other parts of the program as previously described. The non-zero power load is toggled 282 for the duty cycle delay 284 as previously described and returned.

Subroutines for the 256 possible wave form combinations as described are stored in program memory whereby each subroutine corresponds to the magnitude of the sine wave for both power loads operating 90 degrees out of phase. Thus any sinusoidal wave form combination at any operational frequency may be generated by calling the pulse subroutine corresponding to the magnitude of the two sine waves at each point in time.

In a 200 step per revolution stepper motor, there are 50 steps which must be advanced to rotate the stepper motor 90 degrees. In addition, the velocity or speed 290 (FIG. 5) of the drive shaft must be accelerated and decelerated slowly to prevent starting and stopping noise. The image advance routine consists of three segments: an acceleration segment 292, a constant speed operation segment 294, and a deceleration segment 296 with the acceleration and deceleration segments slowly increasing and decreasing the frequency of the sine waves, respectively. Each period of the sine wave advances the stepper motor four steps. Four steps are advanced during the acceleration segment 292, 40 steps are advanced during the operation segment 294 and six steps are advanced during the deceleration segment 296 with the operation segment consisting of one sine wave period or four steps repeated 10 times. Thus both the image slow change routine and the image fast change routine include the acceleration 292, operation 294 and deceleration 296 segments with the operation segment frequency rate being approximately 21 Hz for the slow change routine and approximately 71 Hz for the fast change routine. Each segment calls the appropriate pulse subroutine corresponding to the desired sine wave magnitudes of the two drives every 45 microseconds during the advancement of the stepper motor. Those skilled in the art will appreciate that one period of the sine wave requires many pulse subroutine calls to adequately approximate the analog wave form.

Figure 13:
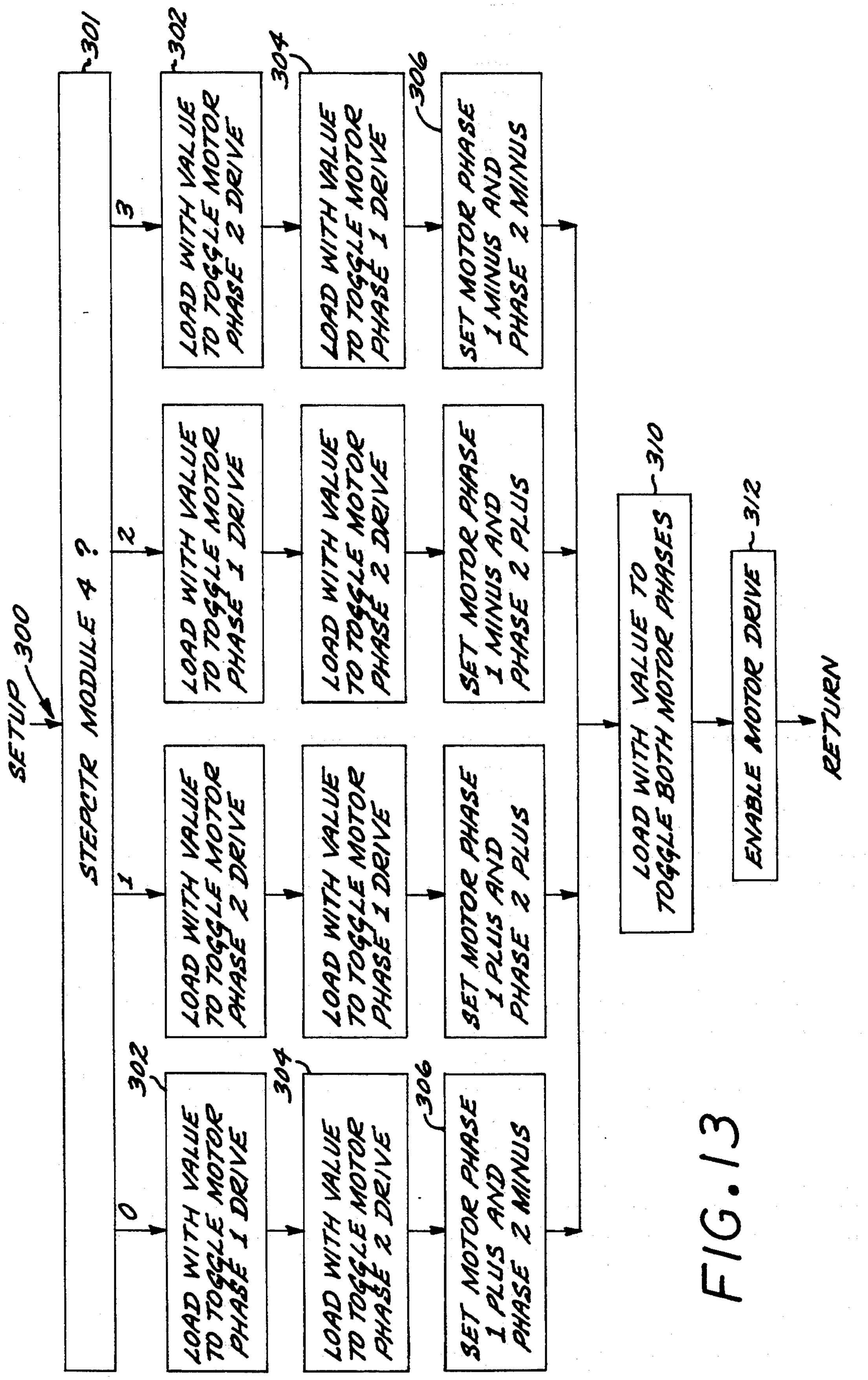

At the beginning of each image change routine 206 and 208 (FIG. 6B), a set up subroutine 300 (FIG. 13) and the step counter is checked 301 to determine the current phase of the motor and prepare for the generation of drive wave forms 302 and 304 and that start at the determined phase 306. The values are stored 310 and the motor is enabled 312. This prevents a sudden and potentially noisy lurch of the motor occurring when it jumps at startup due to the application of an out-of-sync drive wave form. At the conclusion of each image change routine, a wrap up routine 314 (FIG. 14) disables power to the drive motor 316 and increments the step counter 318 by the number of steps taken and upon reaching 200 steps resets to zero 320.

Those skilled in the art will appreciate that the drive control program 98 (FIGS. 6A, 6B, and 6C) periodically pulses the error reset 96 input lead (FIG. 3) during operation. Should the error reset 96 fail to receive a periodic pulse, a reset signal is transmitted to the reset lead 129 of the microprocessor to thereby restart the drive control program.

Figure 3:
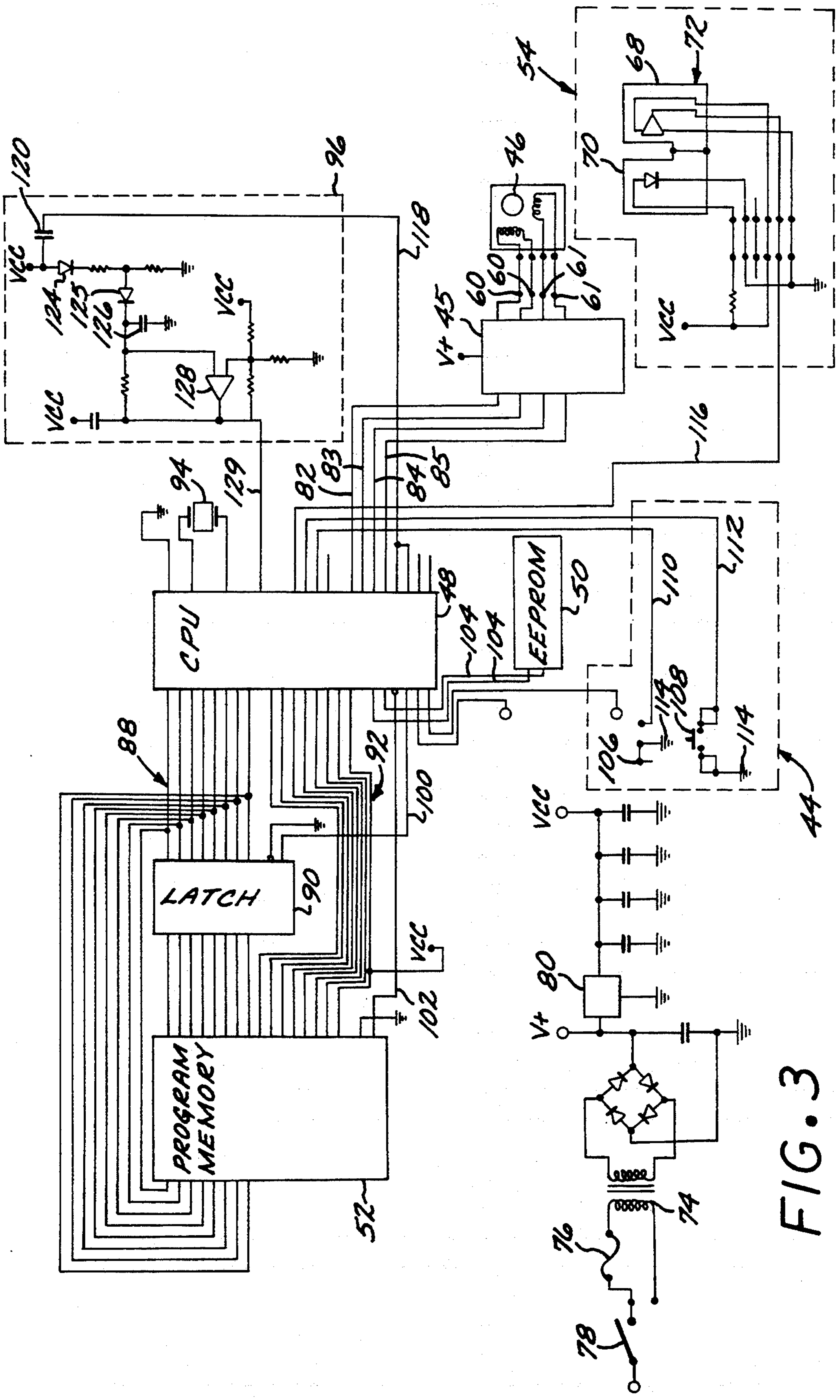
FIG. 3 is a circuit diagram of the drive control and interface circuit included in the apparatus shown in FIG. 1.
Figure 10:
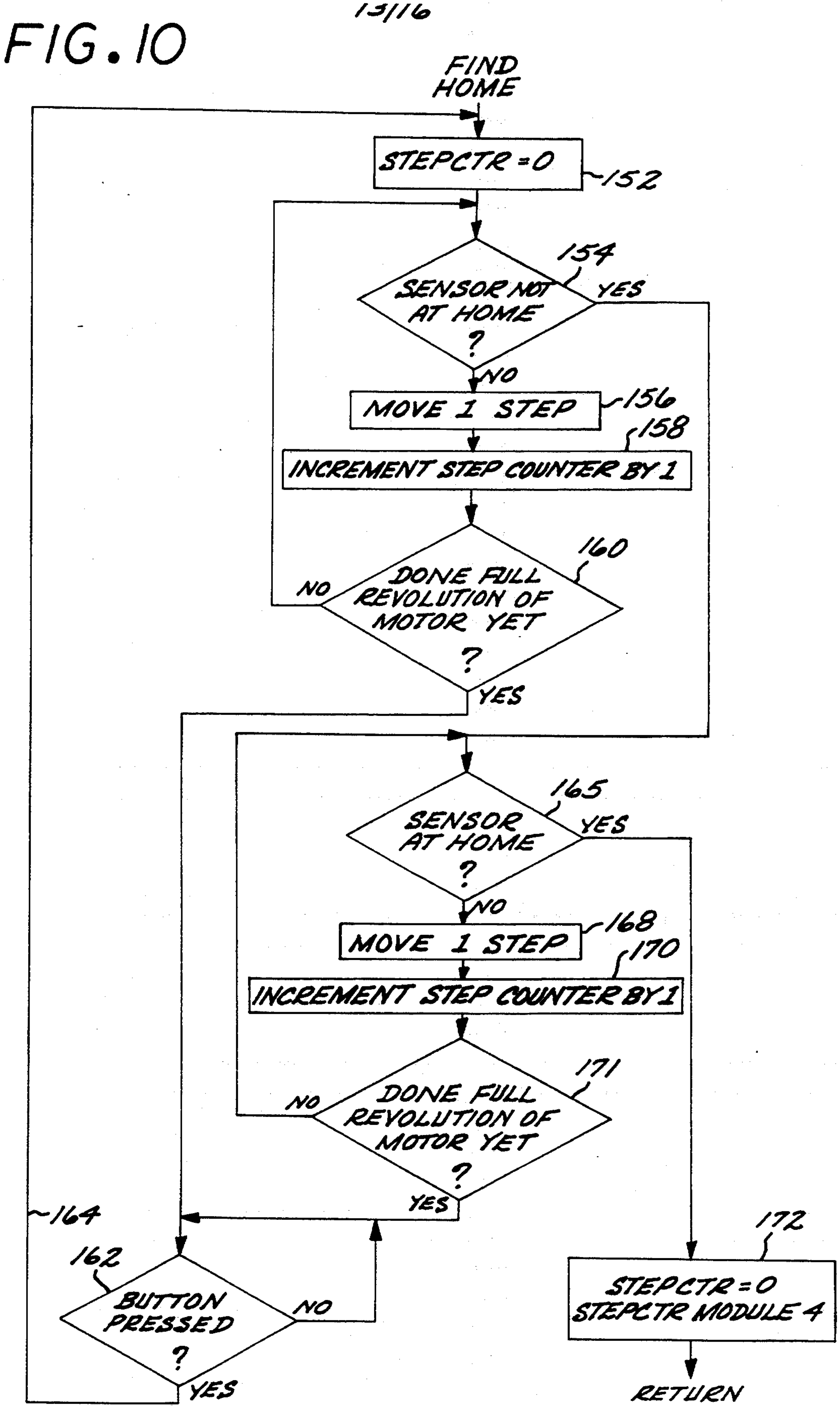
Figure 11:
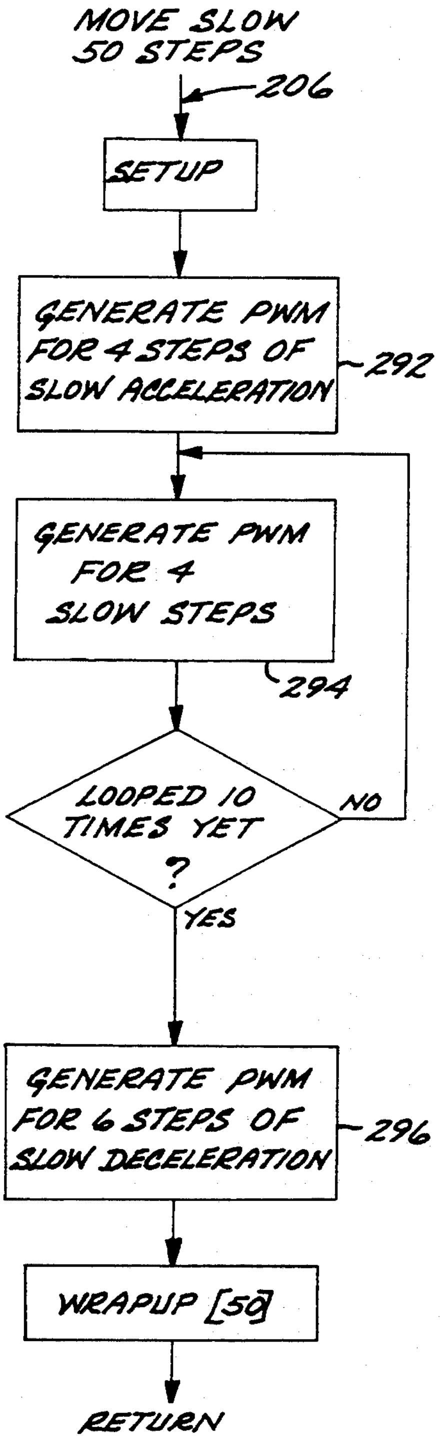
Figure 12:
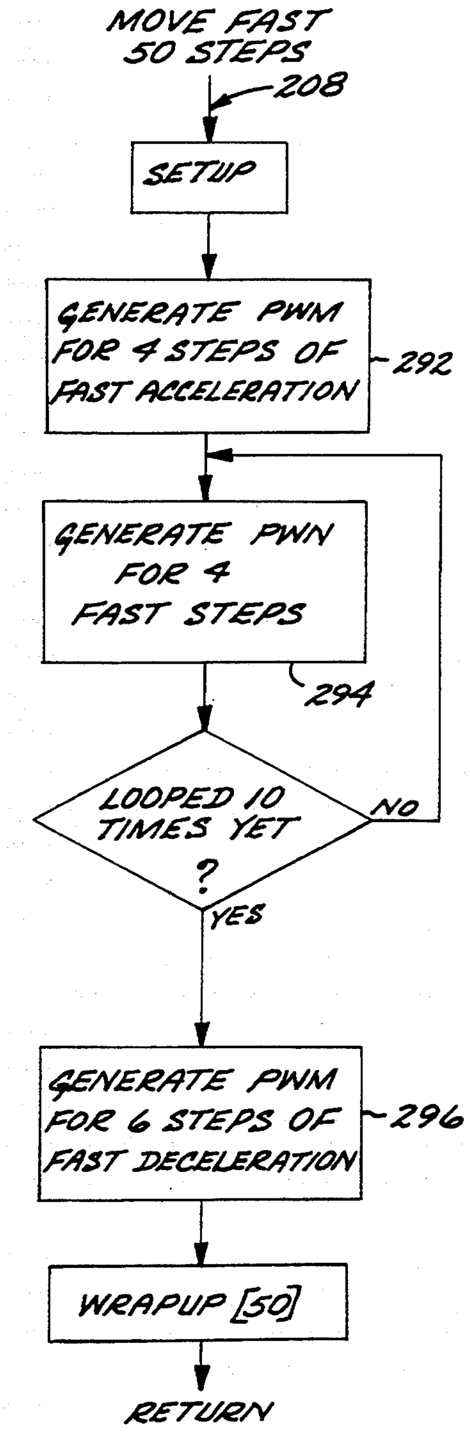

In operation, the operator will turn on the drive control 42 (FIG. 2) by plugging the unit into a wall outlet or by using the optional power switch 78 (FIG. 3). If the button 108 is held down during power up (FIG. 6A), the image display times are reset to the factory preset values, otherwise the last recorded display times are used. The drive control performs a find home routine 146 (FIG. 10) and advances the stepper motor 46 until the homing sensor 54 indicates the first image is displayed. If the run/stop switch 106 is in the stop position (FIG. 6B), the display controller awaits a button event 186 to initiate the advancement to the next image or selection of the switch 106 to run mode. In run mode 194 each of the images is displayed for the corresponding period of time stored in the respective timing registers and then advanced to the next image. If the display time is greater than .5 seconds, then the image slow change routine 206 is initiated, otherwise the image fast change routine 208 is used to enhance any possible animated effects between the images. If a button event 196 occurs during run mode, the programming routine 134 is initiated. In programming mode 134 (FIG. 6C), the button is depressed by the operator four additional times to change the image display whereby the lag time between each button event is stored as the corresponding image display time. At the end of the four button events, the motor resonates to produce an audible buzz sound in response to a discrete power signal, the display times are stored in the view time memory 50, and the drive control returns to run mode 194. Should the microprocessor fail to receive the homing sensor signal at any time the image counter indicates the motor is at home (FIGS. 3 and 6B), the find home routine is initiated (FIG. 10). Should the program hang-up for any reason, the system error reset 96 (FIG. 3) will initiate a microprocessor reset to restart the drive control program. Thus the stepper motor drive shaft 56 (FIGS. 1 and 2) may be rotated at precise 90 degree intervals to display each of the corresponding images.

Those skilled in the art will appreciate that the fast and slow image change routine segments can be rewritten to accommodate any number of images which evenly divide into the total number of steps per revolution of the stepper motor. Thus, for instance, eight images could be displayed by advancing the motor 25 steps at a time. In addition, the image change routines can be rewritten to obtain any running speed, acceleration and deceleration of the stepper motor that may be desired for a specific application or specific configuration of sign. Additionally, the image change routines can be rewritten to accommodate different types of 2-phase steppers motors, with differing numbers of steps per revolution. Finally, any drive coupling mechanism may be incorporated into this device.

From the foregoing, it will be appreciated that the drive control apparatus of the present invention provides a convenient, economical and reliable apparatus for assuring the transition of display images without subjecting the audience to undue noise during the exchange of images and having a simple easy to learn operator interface.

Various modifications and changes may be made with regard to the foregoing detailed description without departing from the spirit of the invention.

What is claimed is:

1. A drive control and interface apparatus for exchanging the display of images in an advertising display comprising:

- an image display device for selectively displaying a plurality of sequential images;
- a drive controller having a microprocessor for quietly changing said image in the display of said image display device;
- a stepper motor having a rotor connected in circuit with said drive controller and responsive to said drive controller to quietly rotate said rotor;
- coupling means for connecting the image display device to said rotor;
- a drive control program having a stepper motor drive routine operated by said microprocessor in said drive controller for controlling said stepper motor to cause said rotor to quietly rotate said rotor connected to said display device by said coupling means to thereby advance said image display to the next sequential image in the display.

2. A drive control and interface apparatus according to claim 1 wherein:

- said microprocessor includes a plurality of inputs and a plurality of outputs;

- program memory for storing said drive control program and connected in circuit to said microprocessor inputs and outputs;
- a motor driver circuit interposed between said microprocessor outputs and said stepper motor rotor;
- erasable memory for storing time settings for said display images and connected to said microprocessor inputs;
- hardware reset means for monitoring operation of said microprocessor;
- a feedback circuit interposed between said stepper motor rotor and said microprocessor input for sensing said advancing of said display images; and
- a control interface connected to said microprocessor inputs and cooperating with said erasable memory and said microprocessor to generate image display timing.

3. A drive control and interface apparatus according to claim 2 wherein:

- said feedback circuit includes:
- a signal generator operative to produce a detectable signal;
- a signal receiver in spaced relation to said signal generator and operative in response to said signal to create a feedback flag for input to said microprocessor;
- a signal inhibitor interposed between said generator and said receiver, said inhibitor formed to normally block reception of said signal by said receiver, and in communication with said image display device and having a signal pass portion corresponding to a predetermined image displayed by said image display device;
- whereby, as a predetermined image is displayed on said image display device, said signal pass portion of said signal inhibitor allows reception of said signal by said signal receiver thus providing said microprocessor with a feedback pulse indicating the display of said image.

4. A method of quietly operating a stepper motor which includes:

- providing a motor driver to generate input current for said stepper motor;
- providing a microprocessor directly connected to said motor driver;
- providing memory linked to said microprocessor;
- programming straight line code in said memory for generating predetermined timing for said microprocessor to discretely approximate sinusoidal waveforms;
- modifying the frequencies of said discretely approximated sinusoidal waveforms during transition between transient and stable operation of said motor; and
- modifying the magnitude of said discretely approximated sinusoidal waveforms during transition between the transient and stable operation of said motor.

* * * * *